United States Patent
Arora et al.

(10) Patent No.: US 11,401,151 B2
(45) Date of Patent: Aug. 2, 2022

(54) MOVABLE BEVERAGE DISPENSING TROLLEY

(71) Applicant: PepsiCo, Inc., Purchase, NY (US)

(72) Inventors: Vipin Arora, Delhi (IN); Rahul Sadashiv Kamble, Faridabad (IN); Gurmeet Singh Bhutani, Gurgaon (IN); Prashant Deshpande, Gurgaon (IN); Dewang Parikh, Ahmedabad (IN)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/193,756

(22) Filed: Mar. 5, 2021

(65) Prior Publication Data
US 2021/0276855 A1 Sep. 9, 2021

(30) Foreign Application Priority Data
Mar. 6, 2020 (IN) .............................. 202041009640

(51) Int. Cl.
| | |
|---|---|
| *B67D 1/08* | (2006.01) |
| *B62B 3/00* | (2006.01) |
| *B67D 1/00* | (2006.01) |
| *B62B 5/00* | (2006.01) |

(52) U.S. Cl.
CPC ............ *B67D 1/0892* (2013.01); *B62B 3/005* (2013.01); *B62B 5/0026* (2013.01); *B67D 1/0081* (2013.01)

(58) Field of Classification Search
CPC .... B67D 1/0892; B67D 1/0081; B62B 3/005; B62B 5/0026; B62B 2202/67
See application file for complete search history.

(56) References Cited

U.S. PATENT DOCUMENTS

| | | | |
|---|---|---|---|
| 3,531,169 | A | 9/1970 | Hoffman et al. |
| 5,890,629 | A | 4/1999 | Loew |
| 7,422,127 | B2 | 9/2008 | Christoffersen et al. |
| 8,640,748 | B2 | 2/2014 | Chera |
| 10,384,920 | B2 | 8/2019 | Henriquez |
| 2008/0314926 | A1 | 12/2008 | Kumar et al. |
| 2012/0048888 | A1* | 3/2012 | Pizzacella ............... F16K 31/30 |
| | | | 222/144.5 |
| 2013/0277394 | A1 | 10/2013 | Edwards |
| 2015/0097001 | A1 | 4/2015 | Gatipon |
| 2020/0122836 | A1* | 4/2020 | Carmona-Puga ...... B64D 11/04 |
| 2021/0259406 | A1* | 8/2021 | Mascaretti ............. A47B 31/06 |

OTHER PUBLICATIONS

International Search Report and Written Opinion in International Application No. PCT/US2021/021153, dated May 25, 2021 (11 pages).

* cited by examiner

Primary Examiner — Donnell A Long
(74) Attorney, Agent, or Firm — Sterne, Kessler, Goldstein & Fox P.L.L.C.

(57) ABSTRACT

A service trolley for dispensing beverages includes a frame having an upper end opposite a lower end, and a tabletop arranged on the upper end of the frame. The trolley further includes wheels arranged on the lower end of the frame configured to allow the frame to roll on a surface. The trolley includes a beverage dispenser arranged within the frame that includes a multi-serve beverage container for storing a beverage, a dispensing head in communication with the beverage container via a conduit, and a pressurized vessel configured to contain a pressurized gas in communication with the beverage container so as to drive a flow of the beverage from the beverage container to the dispensing head.

20 Claims, 13 Drawing Sheets

MOVABLE BEVERAGE DISPENSING TROLLEY

FIELD

Embodiments described herein generally relate to a movable beverage dispensing trolley. Specifically, embodiments described herein relate to a service trolley configured to dispense food and/or beverages, wherein beverages may be dispensed from multi-serve beverage containers using gravity or a pressurized gas.

BACKGROUND

Service trolleys are used to store and organize food and beverages to be distributed to passengers on airplanes, trains, or on other modes of transportation. Such trolleys may store a variety of items including bottled or canned beverages, alcoholic beverages, snacks and packaged meals, kettles, carafes, ice buckets, plastic cups, utensils, napkins, payment processing devices and a cashbox, among various other items. However, service trolleys often provide a limited amount of storage space and it may be difficult for personnel to locate and quickly access the various items. The items may need to be distributed to a large number of passengers, and difficulty accessing items may result in significant delays. As a result, meal or drink services may take more time, causing the passengers to become impatient. If passengers do not timely receive food and beverage items, the passengers may have a negative experience. Thus, an improved service trolley for dispensing beverages and/or food, among other items is desired.

BRIEF SUMMARY OF THE INVENTION

Some embodiments described herein relate to a service trolley that includes a frame having an upper end opposite a lower end, a tabletop arranged on the upper end of the frame, and wheels arranged on the lower end of the frame configured to allow the frame to roll on a surface. The service trolley may further include a beverage dispenser arranged within the frame that includes a multi-serve beverage container for storing a beverage, a dispensing head in communication with the beverage container via a conduit, and a pressurized vessel configured to contain a pressurized gas in communication with the beverage container so as to drive a flow of the beverage from the beverage container to the dispensing head.

In any of the various embodiments discussed herein, the dispensing head may include a bar gun.

In any of the various embodiments discussed herein, the dispensing head may include a nozzle.

In any of the various embodiments discussed herein, the beverage container may be one of a plurality of beverage containers, and the dispensing head may be configured to dispense beverages from the plurality of beverage containers. In some embodiments, the beverage dispenser may further include a container support configured to hold the pressurized vessel and the beverage containers. In some embodiments, the container support may include one or more rails for slideable connection to an upper end of the frame such that the container support may slide into and out of the frame. In some embodiments, the container support may further include a manifold connected to each of the beverage containers and to the pressurized vessel so as to supply the pressurized gas to the beverage containers.

In any of the various embodiments discussed herein, the service trolley may further include a tray dispenser that includes a platform configured to receive and hold trays in a stacked configuration, and a drive mechanism for moving the platform from the lower end toward the upper end of the frame. In some embodiments, the service trolley may be an airline service trolley and the drive mechanism may be manually actuated. In some embodiments, the tray dispenser may further include a belt connected to the platform and to an actuator, such that when the actuator is operated, the belt moves the platform from the lower end to the upper end of the frame. In some embodiments, the tray dispenser may be arranged on a first side of the frame and the beverage dispenser may be arranged on a second side of the frame opposite the first side.

Some embodiments described herein relate to a movable beverage dispensing trolley that includes a frame having an upper end opposite a lower end, a tabletop arranged on the upper end of the frame, and wheels arranged on the lower end of the frame configured to allow the frame to roll on a surface. The movable beverage dispensing trolley may further include a beverage dispenser arranged on the tabletop that includes a platform configured to receive and support beverage containers in an upside-down orientation, and at least one valve in communication with the beverage containers and configured to control dispensing of a beverage from the beverage containers by a gravitational force.

In any of the various embodiments discussed herein, the tabletop may have a first end opposite a second end, and the beverage dispenser may be arranged centrally on the tabletop between the first end and the second end such that the beverage dispenser is accessible from both the first end and the second end of the frame.

In any of the various embodiments discussed herein, the platform may be rotatable about a central post.

In any of the various embodiments discussed herein, the beverage dispenser may include a first plurality of valves facing toward a first side of the frame and a second plurality of valves facing toward a second side of the frame.

In any of the various embodiments discussed herein, the beverage dispenser may include a collapsible support.

Some embodiments described herein relate to a movable beverage dispensing trolley that includes a frame defining a plurality of receptacles, wherein each of the plurality of receptacles is configured to removably receive a beverage dispensing module or a tray dispensing module, a tabletop arranged on the upper end of the frame, and wheels arranged on the lower end of the frame configured to allow the frame to roll on a surface. The beverage dispensing module of the movable beverage dispensing trolley may include a container support for supporting a beverage container containing a beverage and a pressurized vessel containing a pressurized gas, a dispensing head for dispensing the beverage from the beverage container, wherein the dispensing head is in communication with the beverage container via a conduit, and wherein the pressurized gas is configured to drive a flow of the beverage from the beverage container to the dispensing head.

In any of the various embodiments discussed herein, the movable beverage dispensing trolley may include a tray dispensing module that includes a movable platform configured to receive and hold the trays in a stacked configuration, and a drive mechanism for moving the movable platform from a lower end of the frame to an upper end of the frame.

In any of the various embodiments discussed herein, the frame of the trolley may be configured to removably receive at least two beverage dispensing modules.

In any of the various embodiments discussed herein, wherein the beverage dispensing module further may include a manifold connected to each of the beverage containers and to the pressurized vessel.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Service trolleys or carts are often used to serve meals, beverages, and other items to passengers by personnel on a train, airplane, or on other modes of transportation. Beverages are usually distributed by providing passengers with individual cans, or by pouring a bottle or can into a disposable cup and providing the cup to the passenger. As a result, airline personnel must open and pour numerous individual cans in order to serve beverages to each passenger. Opening and pouring the cans may be labor-intensive and time consuming. Further, the need to open cans may result in wasted beverages if the entire contents of a can is not poured. The need to pour a beverage from a can into a cup to serve to a passenger also introduces the risk that the beverage may be spilled resulting in a waste of the beverage and creating a mess. The canned or bottled beverages may also consume significant space and add considerable weight to the aircraft, increasing fuel costs and occupying limited storage space that could otherwise be used to store other items. Additionally, the empty cans or bottles may produce significant waste. Thus, a movable cart that can dispense beverages more easily, efficiently, and with less waste is desired.

Further, service trolleys generally have a fixed construction with a first area or compartment for storing beverages, and a second area or compartment for storing other items, such as trays, meals, and the like. Thus, the amount of space in the trolley for storing beverages may be limited, which may result in the need to more frequently replenish the beverages in the trolley. As the configuration of the trolley is fixed, the service trolley cannot readily be modified to store additional beverages or meals as needed. Thus, a service trolley that is modular and that can be configured to store additional beverages or additional trays is desired to provide increased flexibility.

Some embodiments described herein relate to a service trolley having a beverage dispenser that includes multi-serve beverage containers in communication with a dispensing head such that beverages can be dispensed from the dispensing head, and wherein a flow of the beverage to the dispensing head is driven by a pressurized gas. In this way, beverages can be dispensed into cups more easily and with less waste. Some embodiments described herein relate to a movable beverage dispensing trolley having a modular construction so that beverage dispensing modules and tray dispensing modules may be added to or removed from the trolley as necessary.

Figure 1:
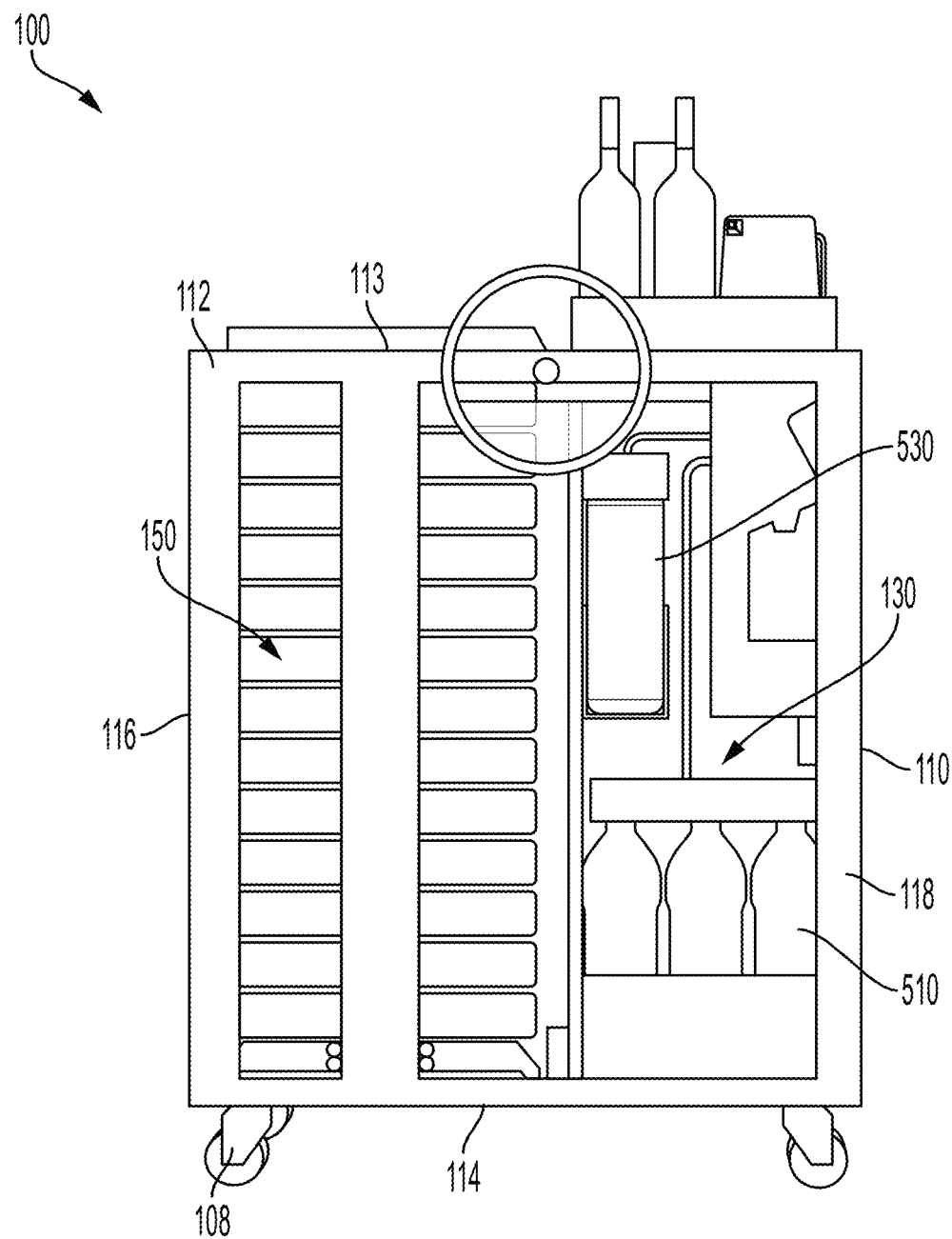
FIG. 1 shows a front view of a movable beverage dispensing trolley according to an embodiment.

A service trolley 100 configured to dispense beverages is shown for example in FIG. 1. Trolley 100 includes a frame 110 having an upper end 112 opposite a lower end 114, and a first side 116 opposite a second side 118. Upper end 112 of frame 110 includes a tabletop 113 on which various items may be placed. Lower end 114 of trolley 100 includes one or more wheels 108 configured to allow service trolley 100 to roll on a surface, such as the ground or a floor. In some embodiments, wheels 108 may be caster wheels. In some embodiments, trolley 100 may include four wheels, with one wheel 108 arranged at each corner of lower end 114 of frame 110. In some embodiments, trolley 100 may include a pair of wheels 108 that are arranged on frame 110 a fixed orientation and a pair of wheels 108 that can pivot or rotate so as to allow trolley 100 to be more easily steered.

In some embodiments, frame 110 of trolley 100 may be shaped as a rectangular prism. Frame 110 may be dimensioned so as to fit within an aisle of an airplane or a train car. In some embodiments, however, frame 110 may be shaped as a cube, among various other shapes. Frame 110 may be composed of a metal, such as aluminum, a metal alloy, a hard plastic, wood, or a combination thereof, among other materials.

In some embodiments, frame 110 of trolley 100 may enclose a beverage dispenser 130 and/or a tray dispenser 150, as shown in FIG. 1. In some embodiments, tray dispenser 150 may be arranged on first side 116 of frame 110, and beverage dispenser 130 may be arranged on second side 118 of frame 110, or vice versa. Thus, tray dispenser 150 and beverage dispenser 130 may be arranged adjacent to one another, in a side-by-side manner. For example, a beverage dispenser 130 may be arranged on a right side of frame 110, and a tray dispenser 150 may be arranged on a left side of frame 110. In some embodiments, trolley 100 may be a full trolley having a beverage dispenser 130 and a tray dispenser 150, or trolley may be a half-trolley having only one of beverage dispenser 130 or tray dispenser 150. Further, trolley 100 may be configured for service by one attendant, or by two attendants standing on opposing sides of trolley 100, as described in further detail herein.

Figure 2:
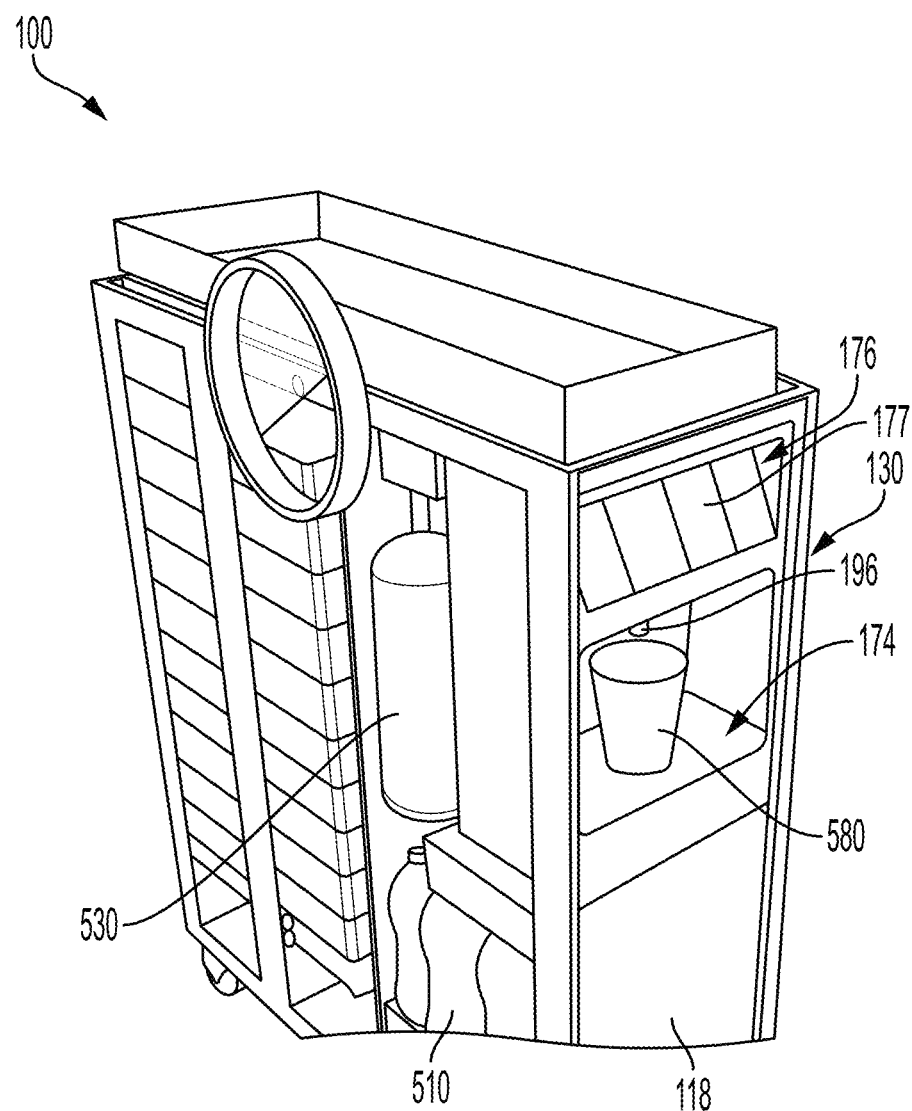
FIG. 2 shows a perspective view of the movable beverage dispensing trolley of FIG. 1.

In some embodiments, beverage dispenser 130 may include one or more beverage containers 510 for storing beverages and a dispensing head 196 in communication with the beverage containers 510 for dispensing the beverages stored in beverage containers 510, as shown in FIG. 2. Beverage dispenser 130 may further include a pressurized vessel 530 for storing a pressurized gas that drives flow of the beverage from beverage container 510 to dispensing head 196. Pressurized vessel 530 of beverage dispenser 130 may be tank, such as a cylindrical tank (e.g., a gas cylinder). Pressurized gas may be, for example, carbon dioxide or nitrogen, among other pressurized gases. Pressurized vessel 530 may be in communication with beverage containers 510 so as to drive fluid flow to dispensing head 196. In some embodiments, pressurized vessel 530 may be in communication with beverage containers 510 via a conduit or a manifold.

As used herein, the term "beverage" includes any consumable free-flowing liquid or semi-liquid product, which may be carbonated or non-carbonated, including but not limited to soft drinks, water, carbonated water, dairy beverages, milkshakes, juices, alcoholic beverages, sports drinks, energy drinks, smoothies, coffee beverages, and tea beverages.

In some embodiments, beverage dispenser 130 may include multiple beverage containers 510 each containing a different beverage. Beverage containers 510 may be multi-serve beverage containers 510 configured to hold multiple servings of a beverage, wherein a serving of a beverage is 6 oz to 20 oz. For example, a beverage container 510 may be configured to hold multiple 8 oz servings of a beverage so that the beverage container may be used to hold and serve several servings. By using a beverage container 510 that holds multiple beverage servings, individual beverage cans or bottles do not need to be opened to provide a serving of a beverage. In some embodiments, each multi-serve beverage container 510 may be configured to hold 3 or more beverage servings. In some embodiments, beverage container 510 may hold 3 to 10 servings of a beverage. In some embodiments, each beverage container 510 may have a volume of 1 liter to 10 liters, 1.5 liters to 8 liters, or 2 liters to 6 liters. In some embodiments, beverage container 510 may be a standard commercially available 2-liter beverage container.

Beverage containers 510 may be removable from beverage dispenser 130 such that when a beverage container 510 is empty, beverage container 510 can be replaced with a new beverage container 510, or beverage container 510 may be refilled and reinstalled. Further, beverage containers 510 may be removed even if full or partially full when it is desired to change the types of beverages available to be dispensed by beverage dispenser 130.

Figure 3:
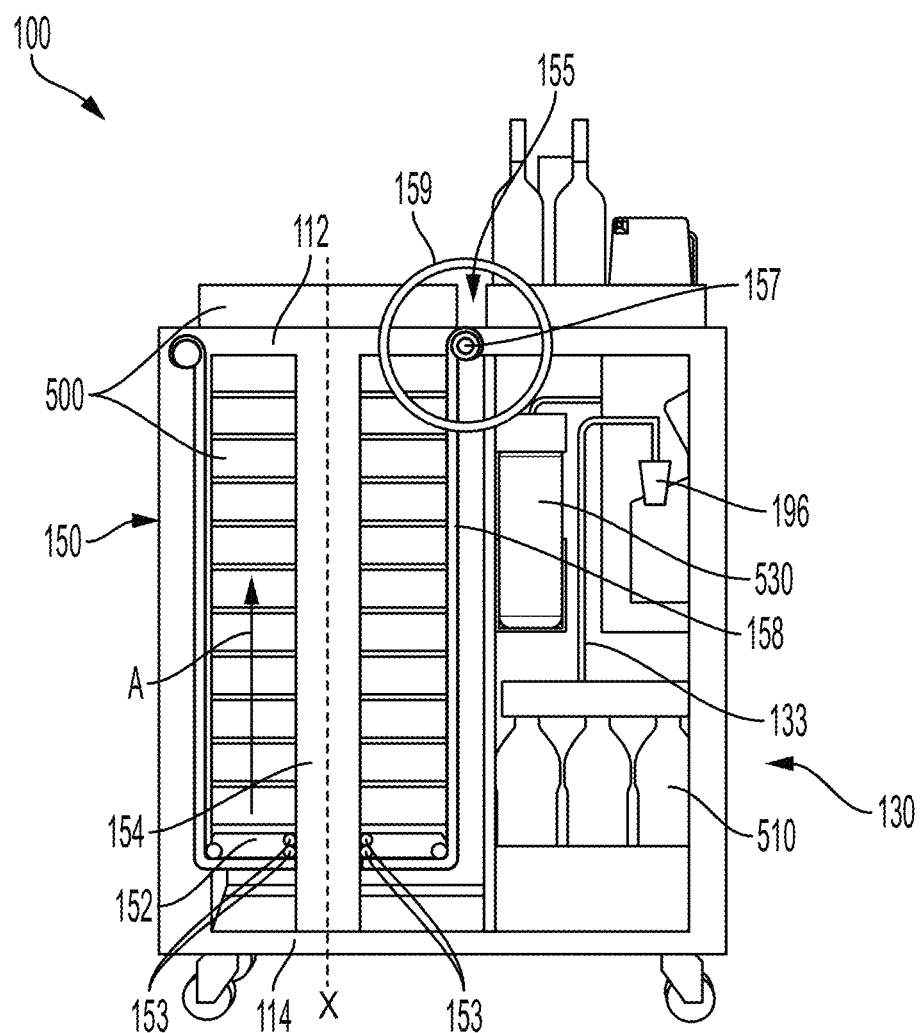
FIG. 3 shows a side view of the movable beverage dispensing trolley of FIG. 1 illustrating operation of the tray dispenser.

Dispensing head 196 is configured to dispense a beverage contained within a beverage container 510, as shown for example in FIGS. 2 and 3. Dispensing head 196 may be in communication with beverage containers 510 via a conduit 133. Pressurized gas from pressurized vessel 530 provides the driving force for communicating beverages from beverage containers 510 to dispensing head 196. In some embodiments, beverage dispenser 130 may include multiple dispensing heads 196 that are each formed as nozzles. In some embodiments, a separate dispensing head 196 is provided for each beverage container 510. For example, in embodiments having six beverage containers 510, there may be six dispensing heads 196. In this way, each dispensing head 196 is used to dispense only a single beverage, which may help to prevent cross-contamination or carryover of flavors that may result from the use of a single dispensing head 196 to dispense various beverages. Further, the use of multiple dispensing heads 196 may allow multiple beverages to be dispensed simultaneously, which may increase the rate at which beverage orders may be filled. However, in some embodiments, beverage dispenser 130 may include a single dispensing head 196 that can be used to dispense any of the various beverages contained in beverage containers 510. In this way, the dispensing head 196 is simplified and requires fewer components and occupies a smaller amount of space on service trolley 100.

In some embodiments, beverage dispenser 130 includes a selection panel 176 configured to be operated to dispense a beverage, as shown in FIG. 2. The selection panel 176 may include actuators 177 for selecting a beverage to be dispensed via the dispensing head 196. For example, actuators 177 may include a plurality of buttons, dials, levers, switches, capacitive sensors (e.g., touch sensors), or the like. Each actuator 177 may correspond to a different beverage container 510 or beverage. Thus, beverages can easily be dispensed by operating the actuator 177 corresponding to the desired beverage.

In some embodiments, beverage dispenser 130 may define a beverage receiving area 174 for receiving a vessel 580 to be filled by dispensing head 196, as shown in FIG. 2. Vessel 580 may be, for example, a disposable cup, such as a cup made of plastic, paper, Styrofoam or the like. Beverage receiving area 174 may be arranged on a side 118 of frame 110 so as to be easily accessed.

In some embodiments, beverage dispenser 130 may be movably positioned on frame 110 so that beverage dispenser 130 may be moved from a stored position in which beverage dispenser 130 is at least partially enclosed within frame 110 of trolley 100, and an extended position in which beverage dispenser 130 extends outwardly from frame 110. In the extended position, beverage containers 510 can be easily accessed for removal and replacement. Beverage dispenser 130 may be configured to slide on frame 110 so as to move from a stored position to the extended position.

In some embodiments, trolley 100 may include a tray dispenser 150, as shown in FIG. 3. Tray dispenser 150 is configured to store and dispense trays 500. Each tray 500 may be used to store one or more meals, such as a boxed or pre-packaged meal. Tray dispenser 150 may include a platform 152 on which a stack of trays 500 may be positioned for dispensing. Platform 152 is configured to move in direction A from a lower end 114 of frame 110 of trolley 100 toward an upper end 112 along a vertical axis X, as shown in FIG. 3. In this way, trays 500 are moved toward upper end 112 of frame 110 so as to be more easily accessed.

In some embodiments, tray dispenser 150 includes a drive mechanism 155 configured to move platform 152 along vertical axis X. In some embodiments, drive mechanism 155 is configured to be driven manually by an operator, i.e., by hand. In some embodiments, tray dispenser 150 includes a belt 158 connected to platform 152 at a first end and connected to an actuator 159 at a second end. In some embodiments, however, platform 152 may be connected to actuator 159 via a rope, chain, cable, or the like, rather than by a belt 158. Actuator 159 may be, for example, a wheel as shown in FIG. 3. However, in some embodiments, actuator 159 may be a hand-operated crank, among other types of actuators. As actuator 159 is operated (e.g., as wheel is rotated), platform 152 moves from lower end 114 toward upper end 112 so as to bring additional trays 500 toward upper end 112 of frame 110 of trolley 100. As wheel is rotated, belt 158 may wind on a spool or axle 157 to which the actuator 159 is connected. In some embodiments, actuator 159 may include a ratcheting mechanism to maintain platform 152 at a desired position between lower end 114 and upper end 112 of frame 110 in order to prevent platform 152 from falling toward lower end 114 under the force of gravity. In some embodiments, an actuator 159 may be removable from trolley 100 so that trolley 100 may be more easily docked in a galley or the like.

In some embodiments, drive mechanism 155 may be automatic and may include a pneumatic actuator, a hydraulic actuator, or an electric motor, among other types of automatic drive mechanisms known in the art. Drive mechanism 155 may be connected to platform 152 in order to move platform 152 from lower end 114 toward upper end 112. Drive mechanism 155 may be operable via a push-button or the like, such that an operator may simply press push-button in order to cause platform 152 to move toward upper end 112 of frame 110 of trolley 100.

In some embodiments, tray dispenser 150 may further include a guideway 154 configured to guide platform 152 as it moves from lower end 114 toward upper end 112. Guideway 154 may include one or more bars or rails extending between lower end 114 and upper end 112 of frame 110. Guideway 154 may be secured to frame 110 or may be integrally formed with frame 110. Guideway 154 may help to maintain platform 152 in a level, horizontal orientation and to ensure platform 152 moves only in the X-direction. In some embodiments, platform 152 may include rollers 153 or bearings that contact guideway 154 and move along guideway 154 as platform 152 is moved. Rollers 153 may facilitate movement of platform 152 and help to maintain alignment of platform 152. Guideway 154 may further help to guide trays 500 on platform 152 from lower end 114 toward upper end 112 of trolley 100, and may help to prevent trays 500 from shifting or falling from a side of frame 110 when trays 500 are being dispensed.

Figure 4:
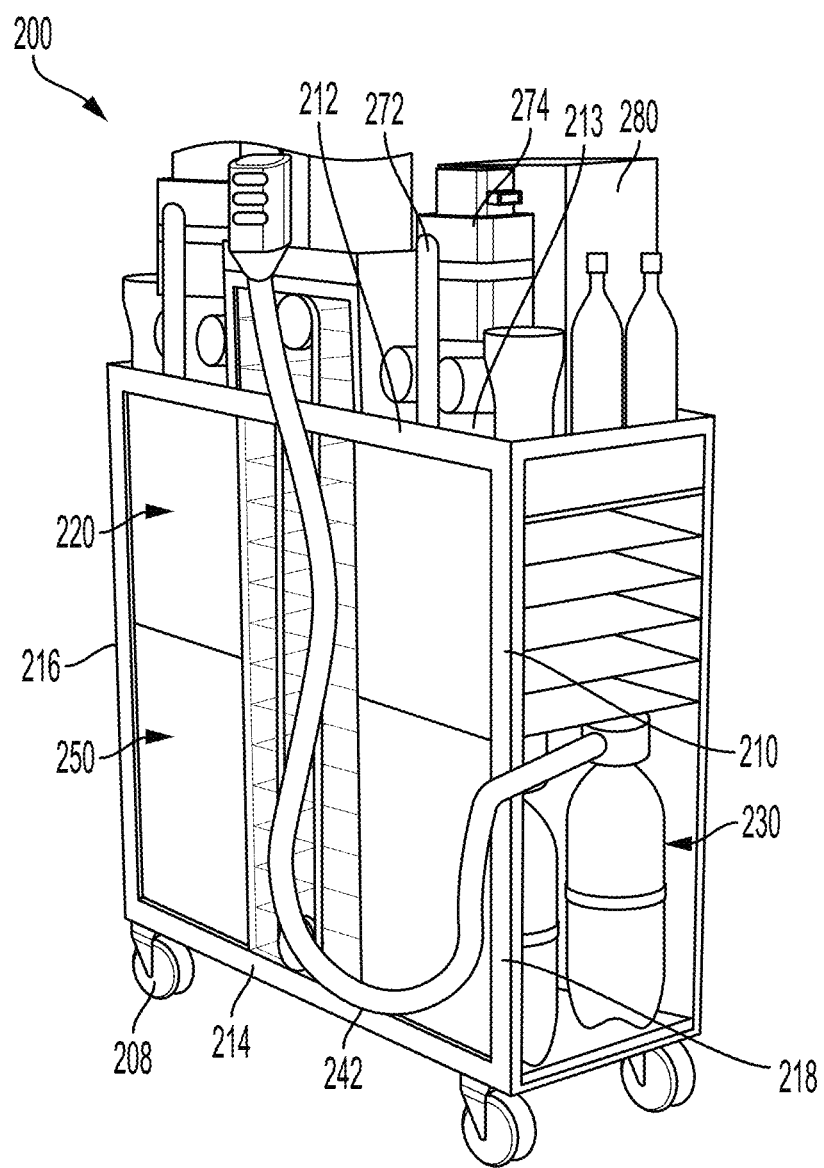
FIG. 4 shows a perspective view of a movable beverage dispensing trolley according to an embodiment.

In some embodiments, a service trolley 200 may have a modular configuration, as shown for example in FIG. 4. In contrast to trolley 100 which may include a beverage dispenser 130 and/or a meal tray dispenser 150 in dedicated locations on trolley 100, trolley 200 may be configured to removably receive one or more beverage dispensing modules 230 and/or one or more tray dispensing modules 250. By allowing for trolley 200 to receive different modules, the configuration of trolley 200 can be customized. This may allow trolley 200 to be customized for various types of service. For example, in order to prepare for a beverage service in the early stages of a flight, trolley 200 may be modified so as to include two beverage dispensing modules 230 and no tray dispensing modules 250. In this way, the amount of beverages capable of being dispensing by trolley 200 is maximized. A meal service may be provided later in the flight, and trolley 200 may be modified to include a single beverage dispensing module 230 and one or more tray dispensing modules 250, or may be modified to include only tray dispensing modules 250. In this way, trolley 200 may be configured to store an increased number of trays 500 and meals for dispensing during the meal service.

Trolley 200, as shown in FIG. 4, may be configured similarly to trolley 100 and includes a frame 210 having an upper end 212 opposite a lower end 214, with a tabletop 213 on upper end 212 and one or more wheels 208 arranged on lower end 214. Frame 210 may have a similar shape and construction materials as described above with respect to frame 110.

In contrast to frame 110 of trolley 100, frame 210 of trolley 200 may define receptacles 220 for removably receiving beverage dispensing modules 230 and tray dispensing modules 250. In some embodiments, frame 210 and receptacles 220 may be configured to receive additional types of modules, such as a module that stores merchandise, a module that stores alcoholic beverages, mixers, and/or bar tools, among other types of modules for storing and organizing various products or materials.

In some embodiments, a trolley as described herein may additionally include a kettle 274 and/or an ice bucket 280, as shown for example by trolley 200 in FIG. 4. Kettle 274 and ice bucket 280 may be arranged on a tabletop 213 of trolley 200. In some embodiments, trolley 200 includes a kettle holder 272 extending from an upper end 212 of trolley 200. Kettle holder 272 may include a pair of arms configured to rotatably support a kettle 274 therebetween, such that kettle 274 may pivot about kettle holder 272 to facilitate pouring liquid from kettle 274 into a vessel. Kettle holder 272 helps to support the weight of kettle 274 so that a user may more easily pour kettle 274. In some embodiments, kettle 274 is removably securable to kettle holder 272. However, in some embodiments, kettle 274 may be fixed to kettle holder 272.

Figure 5:
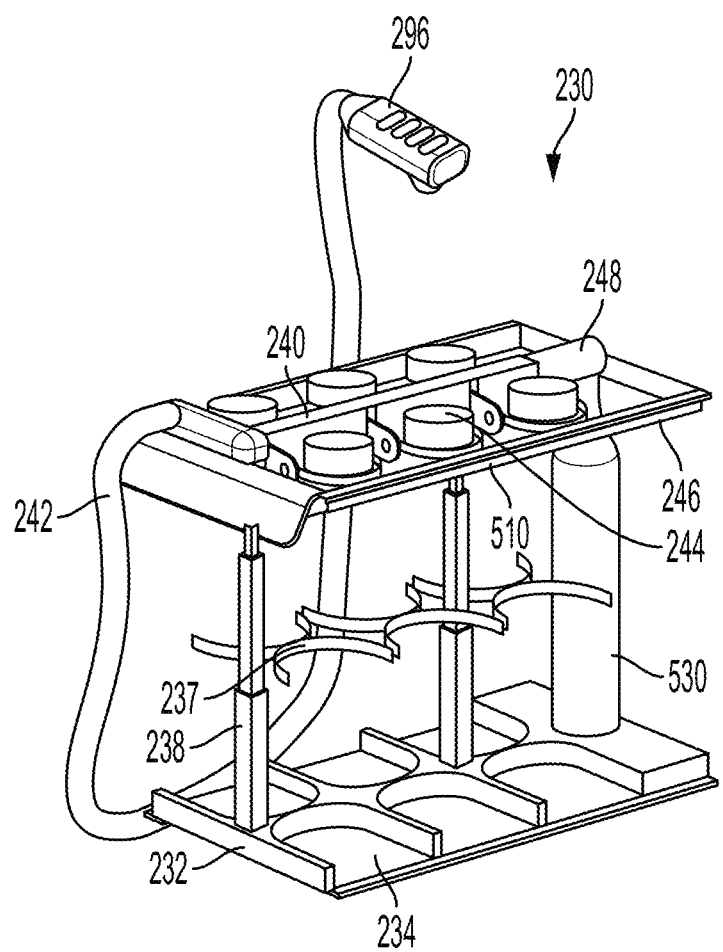
FIG. 5 shows a perspective view of a container support of a movable beverage dispensing trolley according to an embodiment.

In some embodiments, a beverage dispensing module 230 is shown for example in FIG. 5. Beverage dispensing module 230 may be used with existing trolleys or may be used in combination with trolley 100, 200. Beverage dispensing module 230 may include a container support 232 configured to support one or more beverage containers and also a pressurized vessel 530, a dispensing head 296 for dispensing a beverage, and a conduit 242 connecting the dispensing head 296 to beverage containers held on container support 232.

Container support 232 of beverage dispensing module 230 may include a base 234, an upstanding support 238 extending from base 234, and a manifold 240 connected to an upper end of upstanding support 238. Manifold 240 may be configured to communicate pressurized gas from pressurized vessel 530 to beverage containers, and for communicating a beverage from a beverage container to dispensing head 296.

Figure 7:
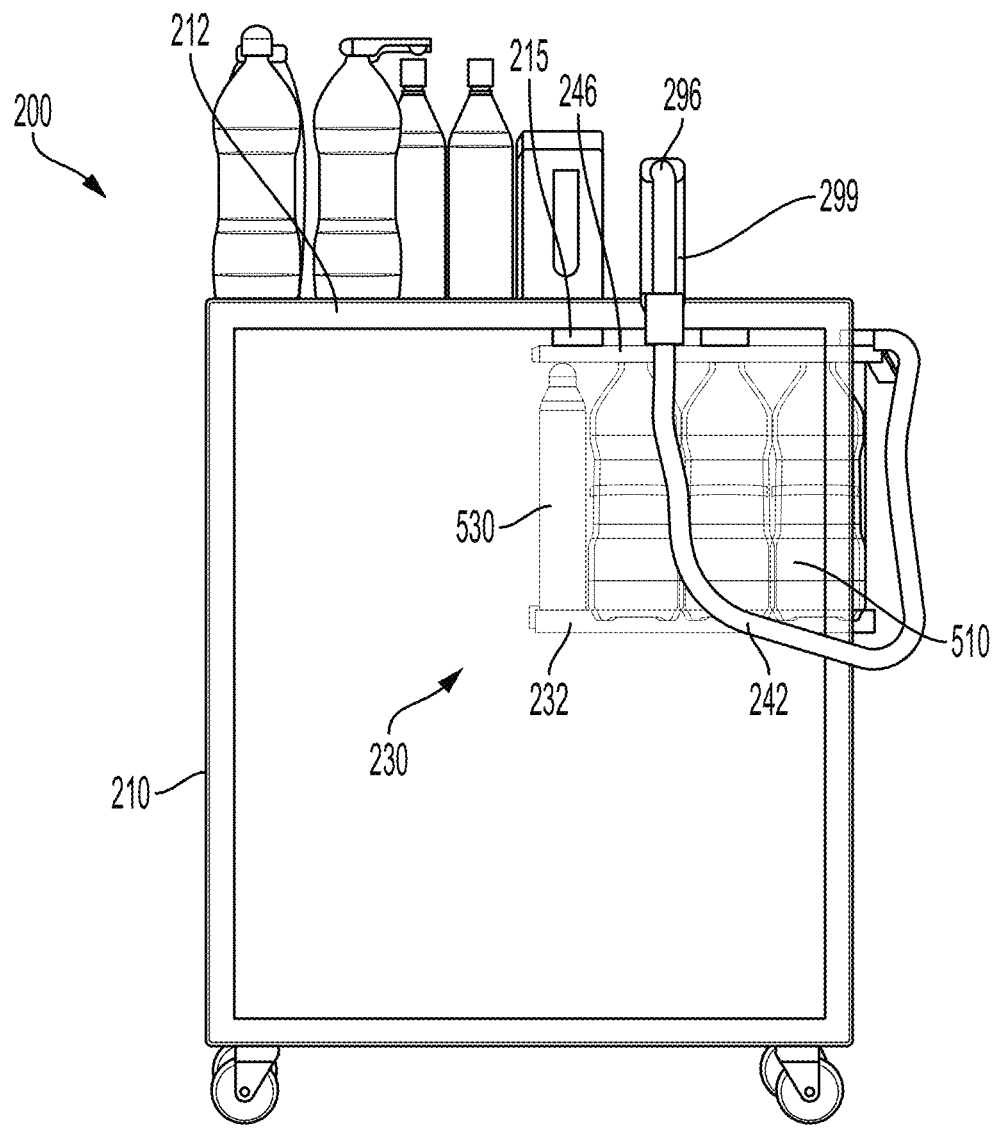
FIG. 7 shows a side view of a movable beverage dispensing trolley having a beverage dispensing module positioned therein according to an embodiment.

Base 234 of beverage dispensing module 230 may be a rectangular platform on which a lower end of each beverage container 510 may rest such that beverage containers 510 are arranged on base 234 in an upright orientation (see FIG. 7). Base 234 may define slots for receiving each beverage container 510. In this way, base 234 may help to prevent beverage containers 510 from shifting on base 234, and helps to maintain each beverage container 510 in a fixed position. Beverage containers 510 may be arranged on base 234 in a square or rectangular layout, depending on the number of beverage containers 510. In some embodiments, base 234 may support beverage containers in multiple rows, and each row may include the same number of beverage containers. In some embodiments, base 234 may be configured to support six beverage containers, such as six multi-serve beverage containers. Beverage containers may be arranged on base 234, for example, in two rows of three containers.

In some embodiments, upstanding support 238 may be perpendicular to base 234. In some embodiments, upstanding support 238 may be a fixed length. However, in some embodiments, upstanding support 238 may be telescopic and may extend in length for use, and may be shortened to provide beverage dispensing module 230 with a compact configuration for storage. In some embodiments, one or more support brackets 237 may be arranged on upstanding support 238 in order to support a sidewall of beverage containers 510 arranged on base 234. Support brackets 237 may be arcuate and may have a C-shape or U-shape.

Manifold 240 of container support 232 may include valves 244 securable to an open upper end of each beverage container arranged on base 234, and a valve 248 securable to a pressurized vessel 530 containing a pressurized gas. Manifold 240 may be arranged generally parallel to base 234 of container support 232. Pressurized gas may be communicated from pressurized vessel 530 to beverage containers 510 via manifold 240. Valves 244 may selectively allow a beverage to flow from beverage container 510 through a conduit 242 to dispensing head 296 to dispense a beverage. In this way, a single valve 244 may be opened to allow a beverage to flow through conduit 242 to dispensing head 296 while the remaining valves 244 are in a closed position.

Figure 6:
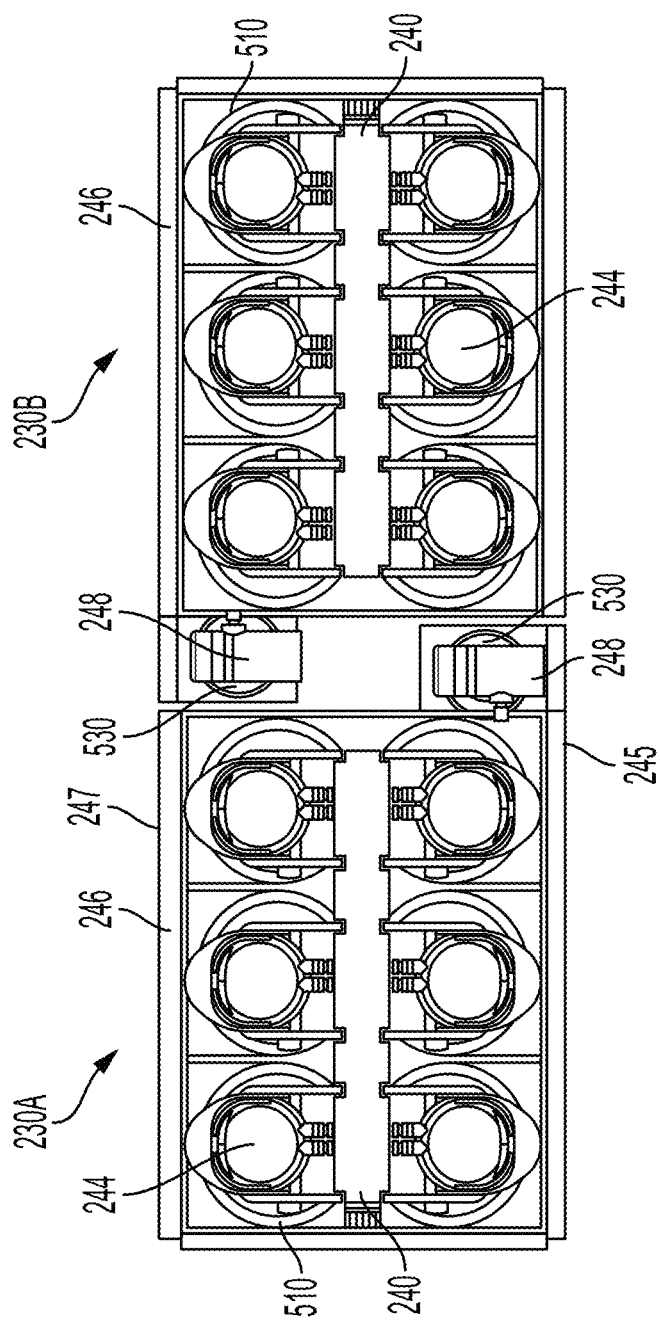
FIG. 6 shows a top-down view of container supports for a movable beverage dispensing trolley according to an embodiment.

In some embodiments, multiple beverage dispensing modules 230 may be arranged within a trolley in a side-by-side manner, as shown in FIG. 6. A first beverage dispensing module 230A may be placed adjacent to a second beverage dispensing module 230B. For example, if each beverage dispensing module 230A, 230B stores beverage containers in a 2×3 layout, beverage dispensing modules 230A, 230B may be arranged so that beverage containers are in a 2×6 layout. In some embodiments, each beverage dispensing module 230A, 230B may include a pressurized vessel 530 that is offset from a center of beverage dispensing module 230A, 230B. When beverage dispensing modules 230A, 230B are arranged side-by-side, the pressurized vessels 530 are adjacent to one another, allowing beverage dispensing modules 230A, 230B to be placed closely together to conserve space.

In some embodiments, a beverage dispensing module 230 may be removably inserted into frame 210 of a trolley 200 or into a receptacle of frame 210, as shown for example in FIG. 7. Beverage dispensing module 230 may include one or more rails 246 at an upper end of container support 232 along opposing sides 245, 247 (see FIG. 6). Rails 246 may be configured to engage with an upper end 212 of frame 210 of trolley 200 within frame 210. Frame 210 may include slots 215 configured to receive rails 246 such that beverage dispensing module 230 may slide within slots 215 of frame 210. Alternatively, frame 210 may include hooks or other fasteners for removably securing to rails 246 of beverage dispensing module 230. In some embodiments, beverage dispensing module 230 and other modules may be supported by shelves within frame 210. Thus, beverage dispensing modules 230 can be easily inserted into and removed from frame 210 for replacement with another module, or for refilling one or more beverage containers 510 of the module.

Figure 8:
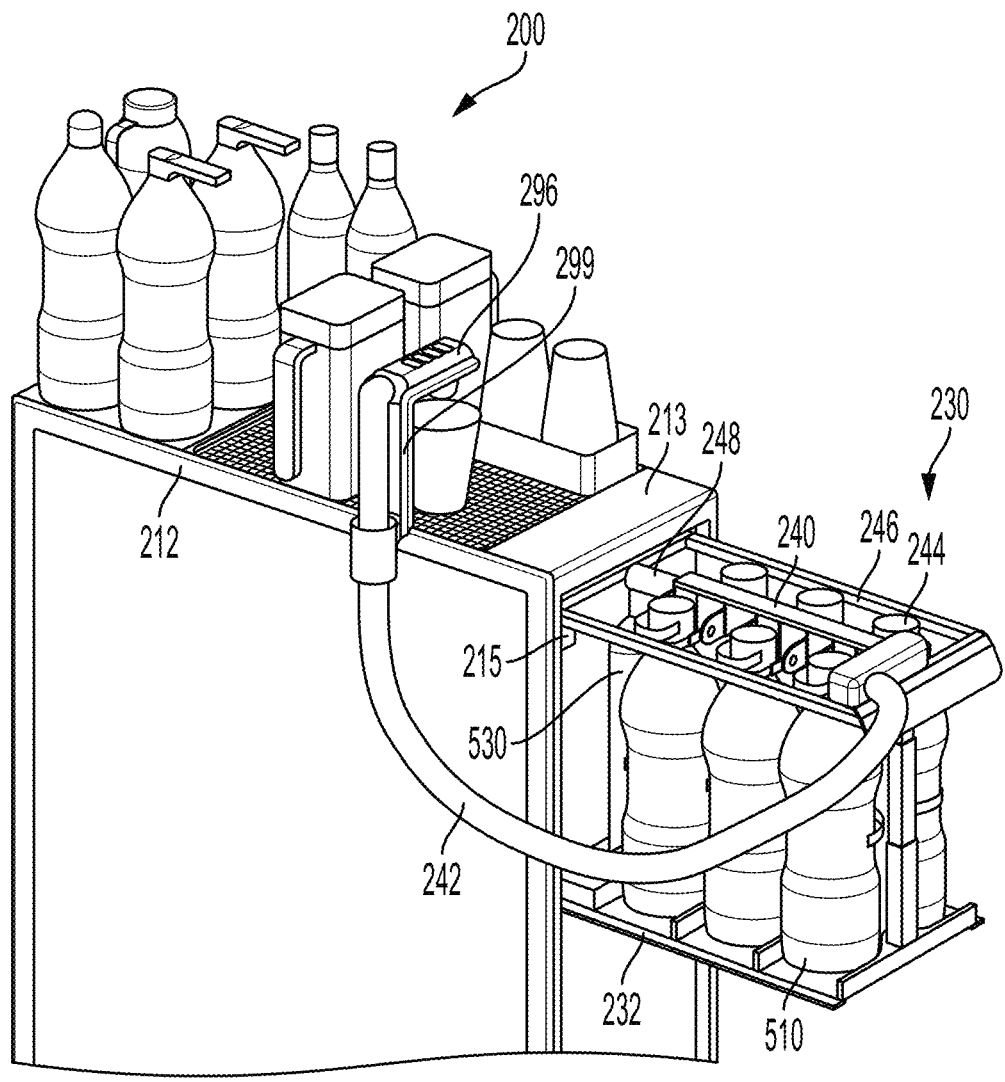
FIG. 8 shows a perspective view of a movable beverage dispensing trolley having a beverage dispensing module according to an embodiment.

In some embodiments, dispensing head 296 of beverage dispensing module 230 may be a bar gun, as shown in FIGS. 7 and 8. Dispensing head 296 may be in communication with beverage containers 510 of beverage dispensing module 230 via a conduit 242. Conduit 242 may be flexible so that dispensing head 296 can be moved freely relative to container support 232. In this way, dispensing head 296 is not fixed and can be moved to a location for filling a vessel with a beverage. In some embodiments, a trolley 200 may further include a dispensing head holder 299. Dispensing head holder 299 may be arranged at upper end 212 of trolley 200 and may removably receive dispensing head 296. Dispensing head holder 299 may be used to hold dispensing head 296 in a fixed position for dispensing a beverage into a vessel arranged on tabletop 213 so that an operator does not have to hold dispensing head 296 while dispensing a beverage. Further, dispensing head holder 299 may be used to hold and store dispensing head 296 when dispensing head 296 is not in use.

Figure 9:
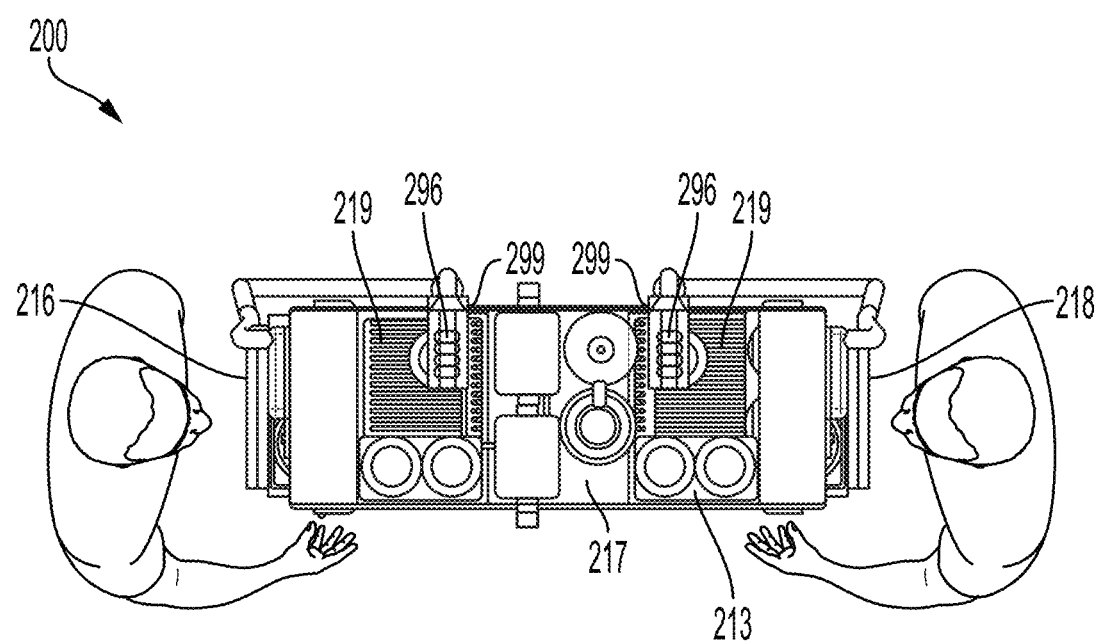
FIG. 9 shows a top down view of a movable beverage dispensing trolley according to an embodiment.

In some embodiments, trolley 200 includes a tabletop 213 having two bar guns as shown in FIG. 9. Trolley 200 may be configured for use by two operators or attendants standing on opposing sides 216, 218 of trolley 200. A first dispensing head holder 299 for holding a dispensing head 296, such as a bar gun, may be arranged closer to first side 216 than to second side 218, and a second dispensing head holder 299 for holding a second dispensing head 296, such as a bar gun, may be arranged closer to second side 218 than to first side 216. However, first and second dispensing head holders 299 may be spaced from first side 216 and second side 218, respectively, so as to provide a work area for an operator standing at first side 216 or second side 218. Tabletop 213 may include a drip tray 219 adjacent each of the first and second dispensing head holders 299. Tabletop 213 may further include a central portion 217 between first and second sides 216, 218 for storing ice buckets, kettles, bottles, and other items. Central portion 217 may be accessible by an operator on either side 216, 218 of trolley 200.

Figure 10:
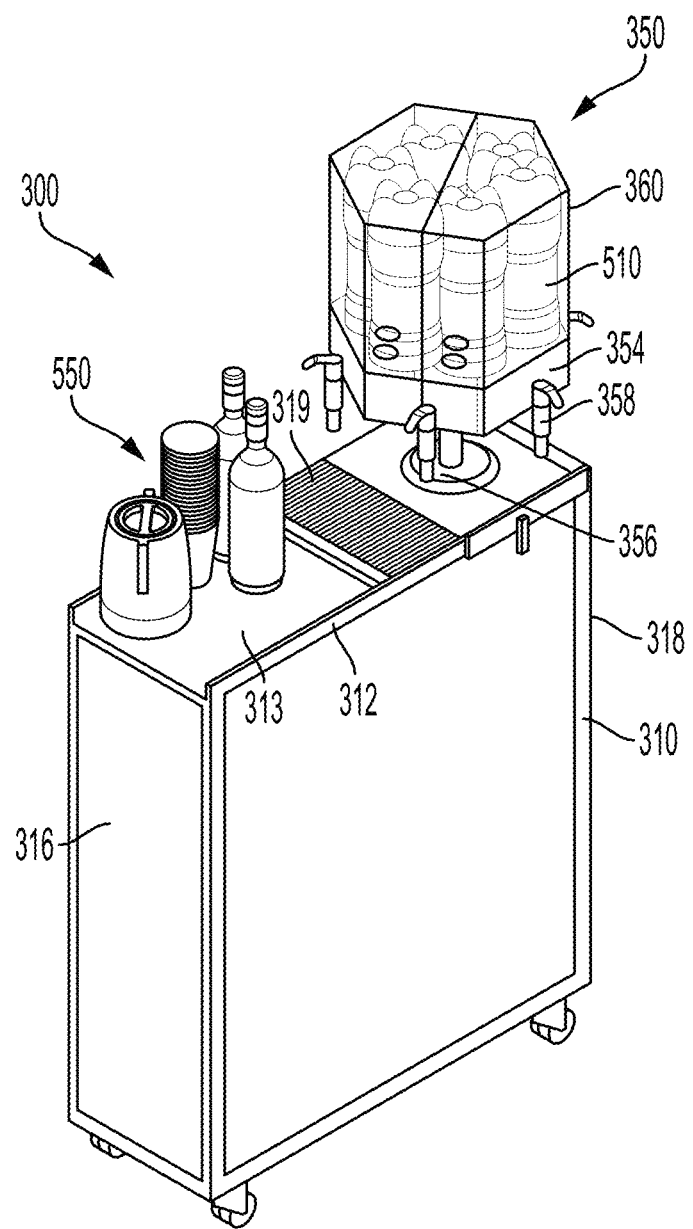
FIG. 10 shows a perspective view of a movable beverage dispensing trolley having a beverage dispenser on a table top of the trolley according to an embodiment.

Some embodiments described herein relate to a movable beverage dispensing trolley 300 that includes a beverage dispenser 350 arranged on an upper end 312 of frame 310, as shown for example in FIG. 10. By including beverage dispenser 350 on tabletop 313 of trolley 300 rather than inside of trolley 300, space within trolley 300 is conserved and may be used for storage of additional items, such as trays and meals, among other items. Further, beverage dispenser 350 may be retrofitted onto an existing service trolley.

Beverage dispenser 350 is configured to removably receive and hold one or more beverage containers 510 that store beverages, such as multi-serve beverage containers as discussed above with respect to trolleys 100, 200. Beverage containers 510 may be arranged on a platform 354 of beverage dispenser 350 that is configured to hold beverage containers 510 in an upside-down orientation (e.g., with an opening of beverage container 510 facing downward in a direction toward tabletop 313). Platform 354 may support beverage containers 510 in an elevated position above tabletop 313 so as to provide space for a cup to be placed beneath beverage containers 510 for filling. As beverage containers 510 are supported in an upside-down orientation, beverages can be dispensed by a gravitational force, without the use of a pressurized gas.

Beverage dispenser 350 may further include dispensing nozzles 358 for controlling dispensing of beverages from beverage containers 510. Dispensing nozzles 358 may be arranged on platform 354 and are in fluid communication with beverage containers 510. Dispensing nozzles 358 may include a valve to control dispensing of beverages from beverage containers 510. Dispensing nozzle 358 may be configured to inhibit escape of carbon dioxide from beverage container 510 in order to prevent beverage from losing its carbonation. A dispensing nozzle that improves carbonation retention is disclosed for example in US Publication No. 2019/0127203, which is incorporated by reference herein in its entirety.

In some embodiments, beverage dispenser 350 may include a housing or cage 360 that encloses beverage containers 510. Cage 360 may help to prevent accidental contact with beverage containers 510 which may displace or damage beverage containers 510. Cage 360 may be transparent so that beverage containers 510 may be viewed through cage 360 in order to allow customers to view the types of beverages available to be dispensed. Further, a transparent cage 360 may allow operators to view the amount of beverage remaining within each beverage container 510.

In some embodiments, platform 354 may be a rotatable platform 354 or carousel configured to rotate about a central post 356. Platform 354 may be configured to hold multiple beverage containers 510. In some embodiment, platform 354 may be configured to hold 1 to 12 beverage containers, 2 to 10 beverage containers, or 3 to 6 beverage containers. Platform 354 may have a triangular shape, a circular shape, a square or rectangular shape, a hexagonal shape, among other shapes. Shape of platform 354 may correspond to the number of beverage containers 510 to be held by platform 354. For example, platform 354 may have a triangular shape when three beverage containers are used, platform 354 may have a square shape when four beverage containers are used, or platform 354 may have a hexagonal shape when six beverage containers are used, etc. In some embodiments, platform 354 may have a circular shape and may hold any number of beverage containers 510. In such embodiments, beverage containers 510 may be evenly spaced around circular platform 354.

In some embodiments, tabletop 313 of trolley 300 may further include a drip tray 319 configured to collect excess liquid dispensed from a nozzle 358. Drip tray 319 may be arranged directly below one or more nozzles 358 of beverage dispenser 350.

Beverage dispenser 350 may be arranged adjacent one side of trolley 300, such as a second side 318 of frame 310 of trolley 300, as shown in FIG. 10. In such embodiments, tabletop 313 at first side 316 of trolley 300 may be available for use as a work space, such as for pouring and mixing drinks, and for storing various items 550, such as cups, alcoholic beverage containers, utensils, carafes, kettles, or pots.

Figure 11:
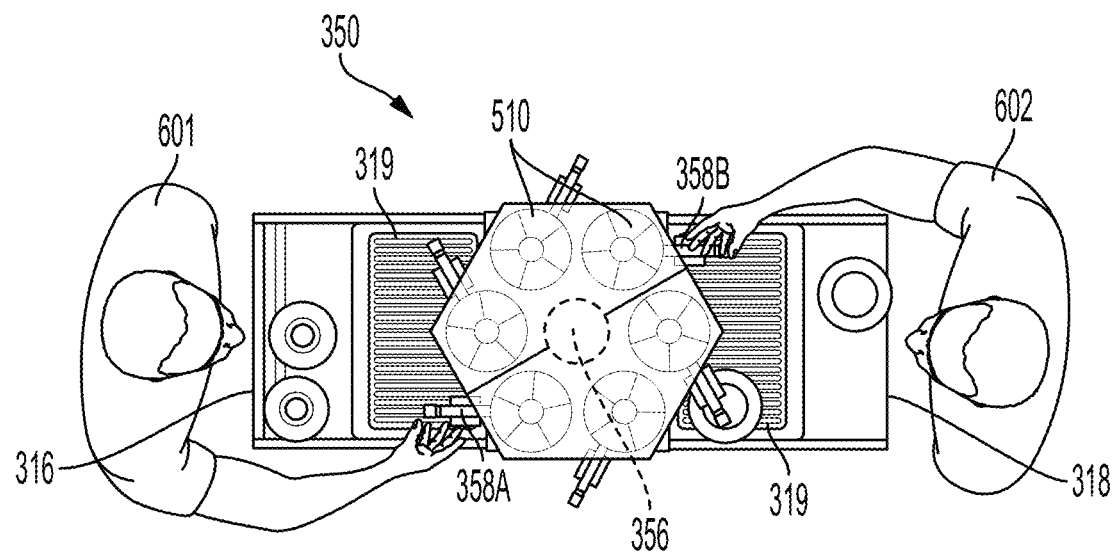
FIG. 11 shows a top down view of a movable beverage dispensing trolley according to an embodiment.
Figure 12:
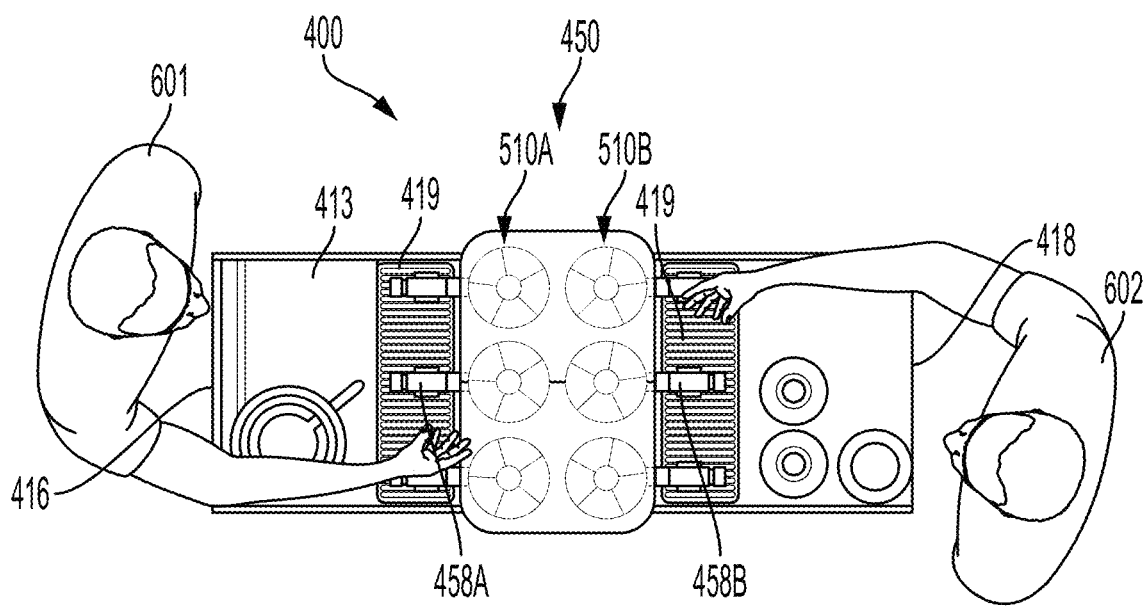
FIG. 12 shows a top down view of a movable beverage dispensing trolley according to an embodiment.

In some embodiments, beverage dispenser 350 may be arranged on a central portion of tabletop, as shown for example in FIGS. 11 and 12. Tabletop 313, as shown in FIG. 11, may include a drip tray 319 adjacent each side 316, 318 of trolley 300 so as to collect excess liquid on either side of beverage dispenser 350. The central location of beverage dispenser 350 may allow two operators 601, 602 standing on opposing sides 316, 318 of trolley 300 to simultaneously use a single beverage dispenser 350. A first operator 601 may use a first nozzle 358A to dispense a first beverage, and a second operator 602 may use a second nozzle 358B to dispense a second beverage. In embodiments having a rotatable beverage dispenser 350, as shown in FIG. 11, beverage dispenser 350 may be rotated about a central post 356 in order to allow an operator to easily access a particular beverage for dispensing. In this way, each operator 601, 602 may access every beverage container 510 available in beverage dispenser 350.

In some embodiments, beverage dispenser 450 may be arranged on a central portion of tabletop 413 and may be arranged in a fixed position (i.e., beverage dispenser 450 is not rotatable), as shown for example in FIG. 12. Tabletop 413 may include a drip tray 419 adjacent each side 416, 418 of trolley 400 for collecting excess liquids from beverage dispenser 450. In such embodiments, a first plurality of beverage containers 510A and nozzles 458A may be arranged facing toward a first side 416 of trolley 400 and a second plurality of beverage containers 510B and nozzles 358B may be arranged facing toward a second side 418 of trolley 400 opposite first side 416. In such embodiments, beverage containers 510A, 510B may be arranged in a square or rectangular configuration. For example, in FIG. 12, three beverage containers 510A face toward first side 416 and three beverage containers 510B face toward second side 418 of trolley 400. First plurality of beverage containers 510A may be the same as the second plurality of beverage containers 510B. In this way, an operator on either side of trolley 400 may dispense the same selection of beverages.

Figure 13:
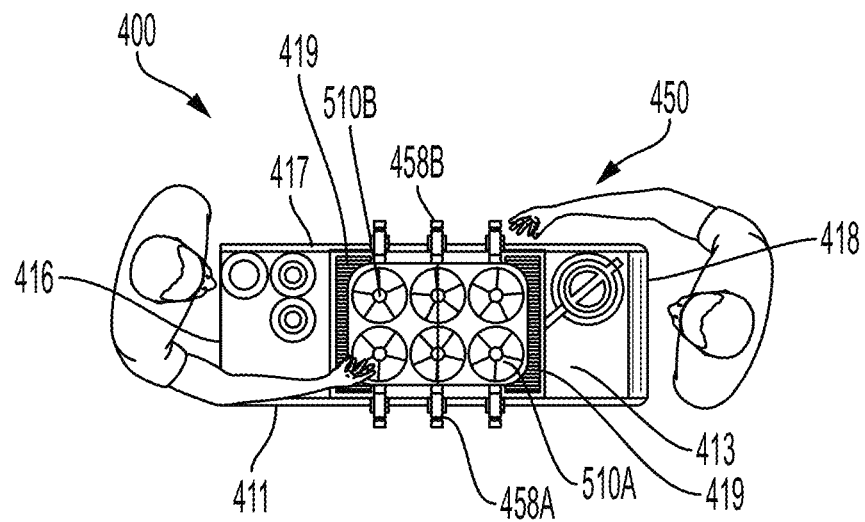
FIG. 13 shows a top down view of a movable beverage dispensing trolley according to an embodiment.

In some embodiments, a trolley 400 may include a beverage dispenser 450 arranged with a first plurality of beverage containers 510A and nozzles 458A facing toward a first lateral side 411 of trolley 300 and a second plurality of beverage containers 510B and nozzles 458B facing toward a second lateral side 417 of trolley 400 opposite first lateral side 411, as shown in FIG. 13. Beverage containers 510A, 510B may be arranged in a square or rectangular configuration. First plurality of beverage containers 510A may be the same as the second plurality of beverage containers 510B so that the same beverages can be dispensed from either lateral side 411, 417 of trolley 400. Similar to FIG. 12, beverage dispenser 450 may be arranged on a central portion of tabletop 413 and may be fixed in position on tabletop 413. Tabletop 413 may include a drip tray 419 adjacent each side 416, 418 of tabletop 413.

Figure 14:
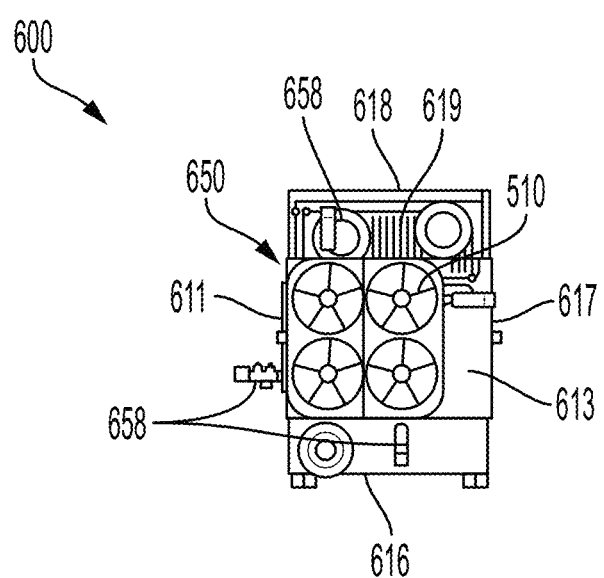
FIG. 14 shows a top down view of a movable beverage dispensing trolley according to an embodiment.

In some embodiments, a beverage dispenser 650 may be arranged on a half trolley 600, as shown in FIG. 14. Thus, trolley 600 may have a compact configuration and may be easily maneuvered. Trolley 600 may be configured for operation by a single operator or attendant. Trolley 600 includes a tabletop 613 with a first side 616 opposite a second side 618, and a first lateral side 611 opposite a second lateral side 617. Beverage dispenser 650 may be arranged on tabletop 613. In FIG. 14, beverage dispenser 650 is arranged in a central portion of table top 613 between first and second sides 616, 618, and is arranged closer to first lateral side 611 than second lateral side 617. However, in some embodiments, beverage dispenser 650 may instead be arranged adjacent second lateral side 617, or beverage dispenser may be arranged centrally between first and second lateral sides 611, 617 and adjacent either first or second side 616, 618. Beverage dispenser 650 may include a plurality of beverage containers 510 each having a dispensing nozzle 658. Dispensing nozzles 658 may be arranged facing any of first or second sides 616, 618, or first or second lateral sides 611, 617, or a combination thereof.

Figure 15:
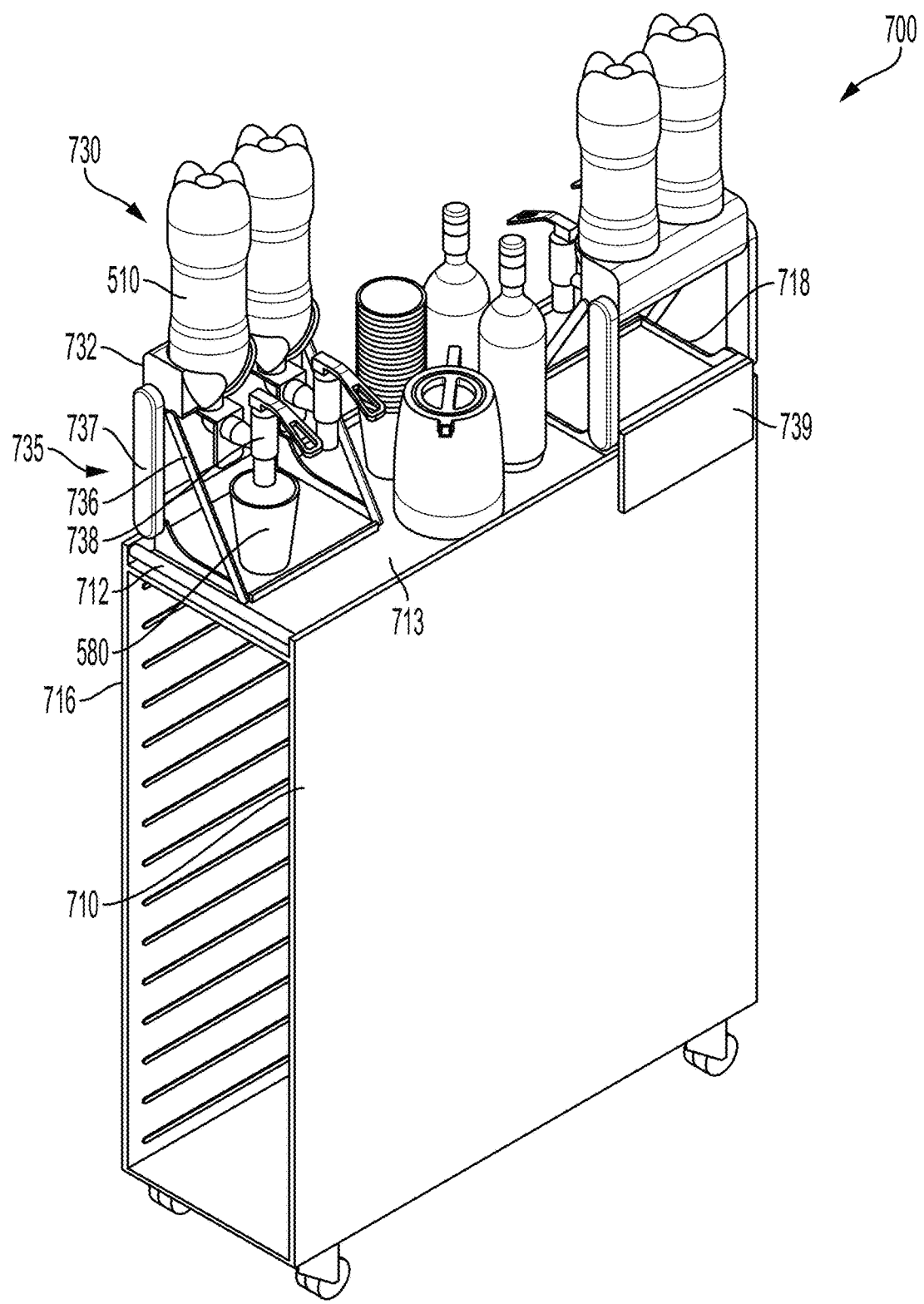
FIG. 15 shows a perspective view of a movable beverage dispensing trolley that includes a beverage dispenser with a collapsible support according to an embodiment.

In some embodiments, a service trolley 700 may include a collapsible beverage dispenser 730, as shown in FIG. 15. Collapsible beverage dispenser 730 may be arranged on tabletop 713 of trolley 700. A collapsible beverage dispenser 730 may be arranged adjacent each side 716, 718 of trolley 700 so that attendants may dispense beverages on opposing sides 716, 718 of trolley 700. Beverage dispenser 730 may include a beverage container support 732 configured to support beverage containers 510 in an upside-down orientation. In this way, beverage containers 510 may dispense beverages under the force of gravity, and without the use of pressurized gas, pumps, or the like. Beverage container support 732 may support beverage containers 510 in an elevated position above tabletop 713 so as to dispense a beverage into a cup 580 arranged on tabletop 713.

Beverage dispenser 730 may include a dispensing valve 738 configured to control dispensing of a beverage from beverage container 510. Valve 738 may be configured to inhibit escape of carbon dioxide from beverage container in order to prevent carbonated beverages from becoming flat and losing their carbonation. Valves 738 may be secured to beverage container support 732 of beverage dispenser 730. Beverage container support 732 may be supported in an elevated position above tabletop 713 via a collapsible stand 735. Stand 735 may include a first leg 737 that is perpendicular to tabletop 713 and a second leg 736 that may pivot into an angled orientation relative to tabletop 713 so that stand 735 has a triangular configuration. To collapse stand 735, second leg 736 may be pivoted toward first leg 737 so that first and second legs 736, 737 are parallel.

In some embodiments, collapsible beverage dispenser 730 may further include a bracket 739 for removably securing beverage dispenser 730 to frame 710 of trolley 700, such as an upper end 712 of frame 710. Specifically, bracket 739 may be configured to extend over an edge of tabletop 713 onto a side of frame 710. Bracket 739 may be securable to trolley 700 via mechanical fasteners, such as thumbscrews, bolts, screws, or the like, or may be secured via friction fit, interference fit, press fit, among other removable fastening methods.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. A service trolley, comprising:
   a frame having an upper end opposite a lower end;
   a tabletop arranged on the upper end of the frame;
   wheels arranged on the lower end of the frame configured to allow the frame to roll on a surface;
   a beverage dispenser arranged within the frame, comprising:
     a multi-serve beverage container for storing a beverage;
     a dispensing head in communication with the multi-serve beverage container via a conduit; and
     a pressurized vessel configured to contain a pressurized gas in communication with the multi-serve beverage container so as to drive a flow of the beverage from the multi-serve beverage container to the dispensing head; and
   a tray dispenser arranged within the frame, comprising:
     a platform configured to receive and hold trays in a stacked configuration; and
     a drive mechanism for moving the platform from the lower end toward the upper end of the frame,
   wherein the tray dispenser is arranged on a first side of the frame and the beverage dispenser is arranged on a second side of the frame opposite the first side.

2. The service trolley of claim 1, wherein the dispensing head comprises a bar gun.

3. The service trolley of claim 1, wherein the dispensing head comprises a nozzle.

4. The service trolley of claim 1, wherein the multi-serve beverage container is one of a plurality of multi-serve beverage containers, and wherein the dispensing head is configured to dispense beverages from the plurality of multi-serve beverage containers.

5. The service trolley of claim 4, wherein the beverage dispenser further comprises a container support configured to hold the pressurized vessel and the plurality of multi-serve beverage containers.

6. The service trolley of claim 5, wherein the container support comprises one or more rails for slideable connection to the upper end of the frame such that the container support is configured to slide into and out of the frame.

7. The service trolley of claim 5, wherein the container support further comprises a manifold connected to each of the plurality of multi-serve beverage containers and to the pressurized vessel so as to supply the pressurized gas to the plurality of multi-serve beverage containers.

8. The service trolley of claim 1, wherein the service trolley is an airline service trolley, and wherein the drive mechanism is manually actuated.

9. A movable beverage dispensing trolley, comprising:
   a frame having an upper end opposite a lower end;
   a tabletop arranged on the upper end of the frame;
   wheels arranged on the lower end of the frame configured to allow the frame to roll on a surface; and
   a beverage dispenser arranged on the tabletop, the beverage dispenser comprising:
     a platform configured to receive and support beverage containers in an upside- down orientation;
     at least one valve in communication with the beverage containers and configured to control dispensing of a beverage from the beverage containers by a gravitational force; and
     a collapsible support configured to support the platform above the tabletop.

10. The trolley of claim 9, wherein the tabletop comprises a first end opposite a second end, and wherein the beverage dispenser is arranged centrally on the tabletop between the first end and the second end such that the beverage dispenser is accessible from both the first end and the second end of the frame.

11. The trolley of claim 9, wherein the beverage dispenser comprises a first plurality of valves facing toward a first side of the frame and a second plurality of valves facing toward a second side of the frame.

12. A movable beverage dispensing trolley, comprising:
a frame having an upper end opposite a lower end and defining a plurality of receptacles, wherein each of the plurality of receptacles is configured to removably receive a beverage dispensing module or a tray dispensing module, and wherein the frame is configured to removably receive at least two beverage dispensing modules;
a tabletop arranged on the upper end of the frame; and
wheels arranged on the lower end of the frame configured to allow the frame to roll on a surface;
wherein each of the at least two beverage dispensing modules, comprises:
a container support for supporting a beverage container containing a beverage and a pressurized vessel containing a pressurized gas; and
a dispensing head for dispensing the beverage from the beverage container, wherein the dispensing head is in communication with the beverage container via a conduit, and wherein the pressurized gas is configured to drive a flow of the beverage from the beverage container to the dispensing head.

13. The trolley of claim 12, further comprising a tray dispensing module, comprising:
a movable platform configured to receive and hold trays in a stacked configuration; and
a drive mechanism for moving the movable platform from the lower end of the frame toward the upper end of the frame.

14. The trolley of claim 12, wherein each of the at least two beverage dispensing modules further comprises a manifold connected to each of the beverage container and to the pressurized vessel.

15. A service trolley, comprising:
a frame having an upper end opposite a lower end;
a tabletop arranged on the upper end of the frame;
wheels arranged on the lower end of the frame configured to allow the frame to roll on a surface;
a beverage dispenser arranged within the frame, comprising:
a multi-serve beverage container for storing a beverage;
a dispensing head in communication with the multi-serve beverage container via a conduit; and
a pressurized vessel configured to contain a pressurized gas in communication with the multi-serve beverage container so as to drive a flow of the beverage from the multi-serve beverage container to the dispensing head; and
a tray dispenser arranged within the frame, comprising:
a platform configured to receive and hold trays in a stacked configuration; and
a drive mechanism for moving the platform from the lower end toward the upper end of the frame, wherein the drive mechanism comprises a belt connected to the platform and to an actuator, such that when the actuator is operated, the belt moves the platform from the lower end toward the upper end of the frame.

16. The trolley of claim 15, wherein the tray dispenser further comprises a guideway configured to guide the platform from the lower end toward the upper end of the frame.

17. The trolley of claim 15, wherein the drive mechanism comprises a motor.

18. A movable beverage dispensing trolley, comprising:
a frame having an upper end opposite a lower end;
a tabletop arranged on the upper end of the frame;
wheels arranged on the lower end of the frame configured to allow the frame to roll on a surface; and
a beverage dispenser arranged on the tabletop, the beverage dispenser comprising:
a platform configured to receive and support beverage containers in an upside-down orientation, wherein the platform is rotatable about a central post; and
at least one valve in communication with the beverage containers and configured to control dispensing of a beverage from the beverage containers by a gravitational force.

19. The trolley of claim 18, wherein the beverage dispenser further comprises a cage configured to enclose the beverage containers supported on the platform.

20. The trolley of claim 18, wherein the beverage dispenser is arranged on a central portion of the tabletop.

* * * * *